(12) United States Patent
Fujisawa et al.

(10) Patent No.: US 10,514,469 B2
(45) Date of Patent: Dec. 24, 2019

(54) ATTITUDE ANGLE CALCULATING DEVICE, METHOD OF CALCULATING ATTITUDE ANGLE, AND ATTITUDE ANGLE CALCULATING PROGRAM

(71) Applicant: Furuno Electric Co., Ltd., Nishinomiya (JP)

(72) Inventors: Naomi Fujisawa, Nishinomiya (JP); Hiroyuki Toda, Nishinomiya (JP); Akihiro Hino, Kakogawa (JP); Hiraku Nakamura, Osaka (JP); Takeshi Nagano, Nishinomiya (JP); Soichiro Etani, Minoh (JP); Masashi Sugimoto, Itami (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 299 days.

(21) Appl. No.: 15/540,023

(22) PCT Filed: Nov. 26, 2015

(86) PCT No.: PCT/JP2015/083153
§ 371 (c)(1),
(2) Date: Jun. 26, 2017

(87) PCT Pub. No.: WO2016/104032
PCT Pub. Date: Jun. 30, 2016

(65) Prior Publication Data
US 2017/0363749 A1 Dec. 21, 2017

(30) Foreign Application Priority Data
Dec. 26, 2014 (JP) .................................. 2014-264586

(51) Int. Cl.
*G01S 19/54* (2010.01)
(52) U.S. Cl.
CPC .................................. *G01S 19/54* (2013.01)
(58) Field of Classification Search
CPC ....................................................... G01S 19/54
See application file for complete search history.

(56) References Cited

U.S. PATENT DOCUMENTS 5,452,077 A * 9/1995 Green .................... G01C 21/24
244/171
5,506,588 A 4/1996 Diefes et al.
(Continued)

FOREIGN PATENT DOCUMENTS

JP 200254946 A 2/2002
JP 2004309134 A 11/2004
(Continued)

OTHER PUBLICATIONS

ISA Japan Patent Office, International Search Report Issued in Application No. PCT/JP2015/083153, dated Feb. 23, 2016, WIPO, 4 pages.
(Continued)

*Primary Examiner* — Mamadou L Diallo
(74) *Attorney, Agent, or Firm* — Alleman Hall Creasman & Tuttle LLP

(57) ABSTRACT

An attitude angle may be calculated with high precision. In a traveling state calculating device, receiving parts may output data for calculation using positioning signals received by antennas, respectively. A phase difference calculating part may calculate a single phase difference for every base line based on the data for calculation outputted by the receivers. An attitude angle calculating part may calculate an attitude angle using the data for calculation and the single phase difference. A calculating condition determining part may determine a contribution of the data for calculation to the calculation of the attitude angle, corresponding to the component of the attitude angle, based on a spatial relationship between the base line and the positioning satellite.

19 Claims, 17 Drawing Sheets

(56) References Cited

U.S. PATENT DOCUMENTS

| | | |
|---|---|---|
| 6,421,003 B1 | 7/2002 | Riley et al. |
| 2002/0029110 A1 | 3/2002 | Fukuda et al. |
| 2003/0154049 A1* | 8/2003 | Toda ................. G01S 19/55 |
| | | 702/151 |
| 2005/0137799 A1* | 6/2005 | Alban .................. G01C 21/165 |
| | | 701/470 |
| 2007/0075896 A1 | 4/2007 | Whitehead et al. |
| 2011/0090113 A1 | 4/2011 | Fenton |
| 2014/0197988 A1* | 7/2014 | Teunissen .............. G01S 19/01 |
| | | 342/357.39 |
| 2014/0244210 A1* | 8/2014 | Cobbin ................ G01B 21/22 |
| | | 702/151 |
| 2015/0145720 A1* | 5/2015 | Matthews ............. G01S 19/53 |
| | | 342/357.36 |
| 2015/0168562 A1* | 6/2015 | Nichols ................. G01S 19/54 |
| | | 342/357.37 |

FOREIGN PATENT DOCUMENTS

| | | |
|---|---|---|
| JP | 2005106563 A | 4/2005 |
| JP | 2006023167 A | 1/2006 |
| JP | 2007101484 A | 4/2007 |
| JP | 2008014721 A | 1/2008 |
| JP | 2008216062 A | 9/2008 |
| JP | 2013507620 A | 3/2013 |

OTHER PUBLICATIONS

Wang et al., "An Improved Satellite Selection Method in Attitude Determination Using Global Positioning System (GPS)," Recent Patents on Space Technology, vol. 1 No. 1, Sep. 11, 2009, 6 pages.
European Patent Office, Supplemental European Search Report Issued in Application No. 15872601.8, dated Aug. 23, 2018, Germany, 8 pages.

* cited by examiner

ATTITUDE ANGLE CALCULATING DEVICE, METHOD OF CALCULATING ATTITUDE ANGLE, AND ATTITUDE ANGLE CALCULATING PROGRAM

CROSS REFERENCE TO RELATED APPLICATIONS

This application is a U.S. National stage of International Application No. PCT/JP2015/083153 filed on Nov. 26, 2015, which in turn claims priority to Japanese Patent Application No. 2014-264586 filed on Dec. 26, 2014, the entire disclosure of each of which is hereby incorporated herein by reference for all purposes.

TECHNICAL FIELD

The present disclosure relates to an attitude angle calculating device which may calculate an attitude angle of a movable body, such as a ship, a flight object, and a vehicle. The present disclosure also relates to a method of calculating an attitude angle, and an attitude angle calculating program.

BACKGROUND ART

Currently, various devices which calculate a traveling state of a movable body using GPS signals have been in practical use. For example, an attitude calculating device disclosed in Patent Document 1 includes four GPS antennas. Lengths of base lines (base lengths) which respectively connect the four antennas are different.

The attitude calculating device disclosed in Patent Document 1 may be selected two antennas which are in a receiving state in which positioning is possible and have the longest base length. The attitude calculating device disclosed in Patent Document 1 calculates an attitude by using the GPS signals received by the two GPS antennas.

REFERENCE DOCUMENT OF CONVENTIONAL ART

Patent Document

Patent Document 1 JP2008-014721A

DESCRIPTION OF THE DISCLOSURE

Problem to be Solved by the Disclosure

Although the method of the attitude calculating device disclosed in Patent Document 1 takes the spatial relationship of the GPS antennas into consideration, the calculation accuracy of the attitude may not be improved solely by the spatial relationship of the antennas.

Therefore, the purpose of the present disclosure is to provide an attitude angle calculating device, a method of calculating an attitude angle, and an attitude angle calculating program, which may calculate the attitude angle with high precision.

SUMMARY OF THE DISCLOSURE

An attitude angle calculating device according to this disclosure may include a plurality of antennas, a plurality of receiving parts, an attitude angle calculating part, and a calculating condition determining part.

The plurality of antennas may receive a positioning signal from a positioning satellite, respectively. The plurality of receiving parts may be provided for every antenna that constitutes the plurality of antennas, and output data for calculation using the positioning signals received by the antennas. The attitude angle calculating part may calculate each component of an attitude angle using the data for calculation. The calculating condition determining part may determine a contribution of the data for calculation to the calculation of the attitude angle for every component of the attitude angle, based on a spatial relationship between a base line connecting two antennas among the plurality of antennas and the positioning satellite.

With this configuration, setting of weight for the data for calculation suitable for calculating a target attitude angle component, or selection of the data for calculation may be possible. Thus, the target attitude angle component may be calculated with high precision.

In the attitude angle calculating device according to this disclosure, the calculating condition determining part may include an accuracy degradation index calculating part configured to calculate an accuracy degradation index for every component of the attitude angle based on the spatial relationship of the base line and the positioning satellite, and a contribution determining part configured to determine the contribution using the accuracy degradation index.

With this configuration, the contribution for every positioning satellite (every data for calculation obtained by the positioning signal) may be determined by using the accuracy degradation index (DOP). Thus, the target attitude angle component may be calculated with high precision.

Effect of the Disclosure

According to the present disclosure, the attitude angle may be calculated with high precision.

MODES FOR CARRYING OUT THE DISCLOSURE

A traveling state calculating device, a method of calculating a traveling state, and a traveling state calculating program according to a first embodiment of the present disclosure are described with reference to the accompanying drawings. As a movable body illustrated in this embodiment, although a surface ship is described as one example, it may be any of other marine surface movable bodies, submarine movable bodies, land movable bodies such as automobiles, and air movable bodies such as airplanes. Note that, as positioning signals illustrated in this embodiment, they may be positioning signals of GNSS (Global Navigation Satellite System), and, specifically, positioning signals of GPS (Global Positioning System), GLONASS (Global Navigation Satellite System), and/or Galileo. Note that the positioning signals of a plurality of systems may be used, instead of using the positioning signals of a single system.

Figure 1:
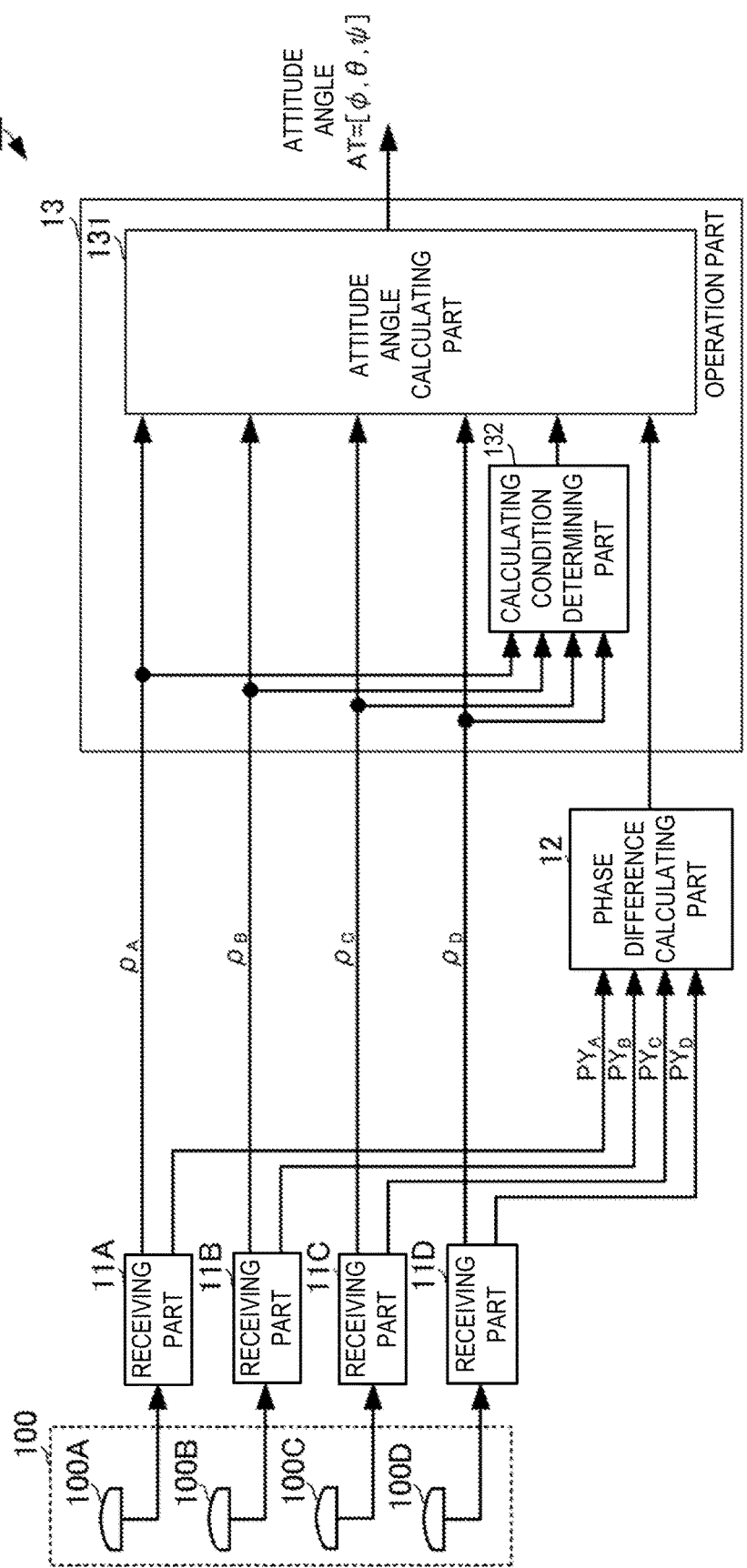
FIG. 1 is a block diagram illustrating a configuration of a traveling state calculating device according to a first embodiment of the present disclosure.
Figure 2:
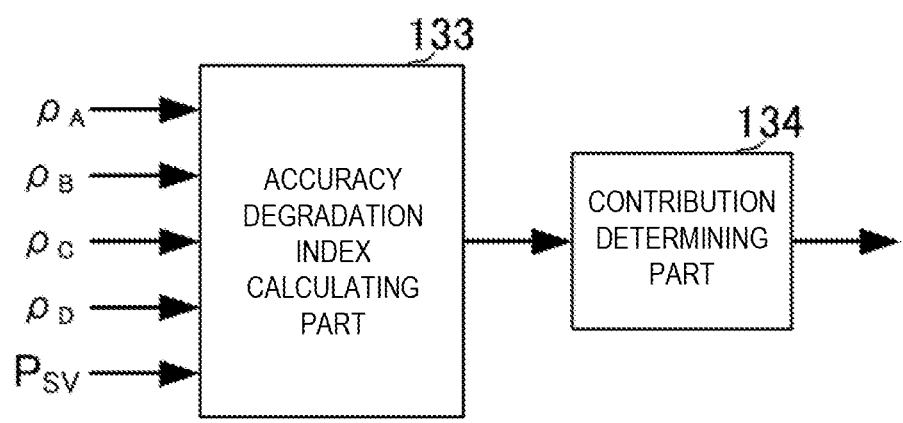
FIG. 2 is a block diagram illustrating a configuration of a calculating condition determining part according to the first embodiment of the present disclosure.
Figure 3:
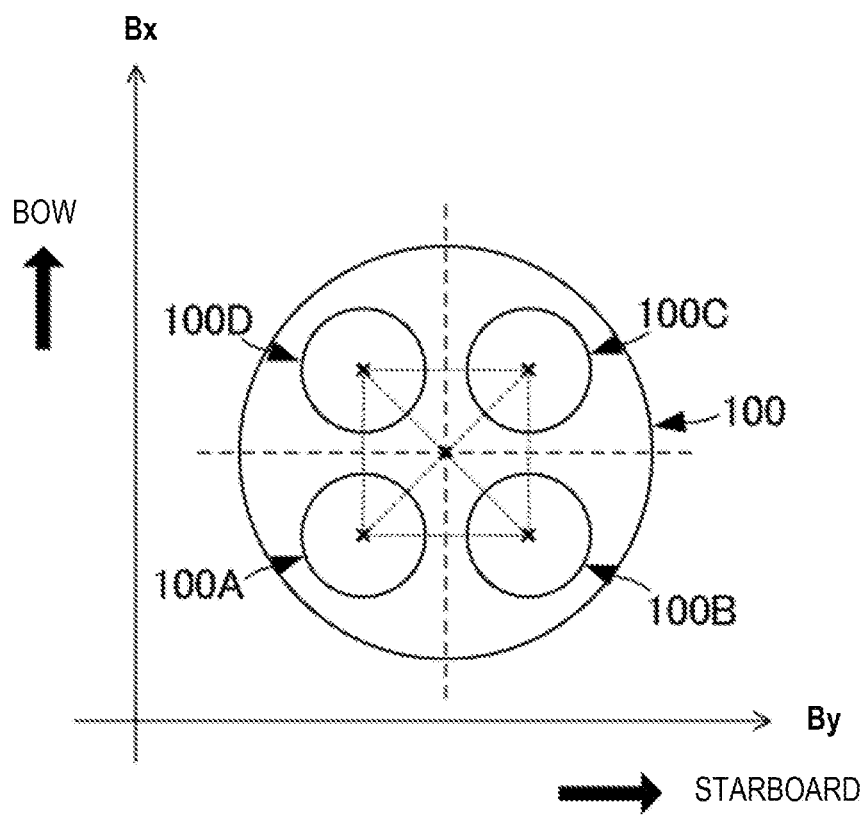
FIG. 3 is a view illustrating a spatial relationship of the antennas according to the first embodiment of the present disclosure.

FIG. 1 is a block diagram illustrating a configuration of the traveling state calculating device according to the first embodiment of the present disclosure. FIG. 2 is a block diagram illustrating a configuration of a calculating condition determining part according to the first embodiment of the present disclosure. FIG. 3 is a view illustrating a spatial relationship of the antennas according to the first embodiment of the present disclosure.

As illustrated in FIG. 1, a traveling state calculating device 10 including an attitude angle calculating device according to this embodiment may be provided with an antenna part 100, receiving parts 11A, 11B, 11C and 11D, a phase difference calculating part 12, and an operation part 13. The antenna part 100 may include antennas 100A, 100B, 100C and 100D. The operation part 13 may include an attitude angle calculating part 131 and a calculating condition determining part 132. As illustrated in FIG. 2, the calculating condition determining part 132 may include an accuracy degradation index calculating part 133 and a contribution determining part 134.

The antenna part 100 may be disposed at a location of a ship where the sky is visible without obstructions. As illustrated in FIG. 3, an arrangement pattern of the antennas 100A, 100B, 100C and 100D may be spread two-dimensionally.

As one example of the specific arrangement pattern illustrated in FIG. 3, the antennas 100A, 100B, 100C and 100D may be disposed at four corners of a square, when seen in a plan view. The antennas 100A and 100D may be disposed so that a base line connecting these antennas 100A and 100D is parallel to a Bx-direction (a direction connecting the bow and the stern of the ship (a bow-stern direction)) of a BODY coordinate system. The antennas 100B and 100C may be disposed so that a base line connecting these antennas is parallel to the Bx-direction of the BODY coordinate system.

The antennas 100A and 100B may be disposed so that a base line connecting these antennas 100A and 100B is parallel to a Bx-direction (a direction connecting the starboard and the port (a starboard-port direction)) of the BODY coordinate system.

A distance between the antennas 100A and 100B, a distance between the antennas 100B and 100C, a distance between the antennas 100C and 100D, and a distance between the antennas 100D and 100A may be shorter than a wavelength of the positioning signal. More specifically, the distances between these antennas may desirably be about ½ of a wavelength λ (λ/2) of the positioning signal, for example. By setting the distances between the antennas to about λ/2, a determination of integral value bias may become easy.

Note that this arrangement is merely an example and two or more antennas may be disposed. That is, at least one base line may be set.

The antenna 100A may be connected to the receiving part 11A. The antenna 100A may receive the positioning signals transmitted from the positioning satellites, and output them to the receiving part 11A. The antenna 100B may be connected to the receiving part 11B. The antenna 100B may receive the positioning signals transmitted from the positioning satellites, and output them to the receiving part 11B. The antenna 100C may be connected to the receiving part 11C. The antenna 100C may receive the positioning signals transmitted from the positioning satellites, and output them to the receiving part 11C. The antenna 100D may be connected to the receiving part 11D. The antenna 100D may receive the positioning signals transmitted from the positioning satellites, and output them to the receiving part 11D.

The receiving parts 11A, 11B, 11C and 11D may be synchronized with each other. For example, the receiving parts 11A, 11B, 11C and 11D may accept an input of a common clock signal, and perform an acquisition and tracking of the positioning signals, synchronized with the clock signal.

The receiving part 11A may acquire and track the positioning signals, and calculate a pseudo range $\rho_A$ for every positioning signal (every positioning satellite). The receiving part 11A may output the pseudo range $\rho_A$ to the operation part 13. The receiving part 11A may calculate a carrier phase measurement $PY_A$ for every positioning signal (every positioning satellite). The receiving part 11A may output the carrier phase measurement $PY_A$ to the phase difference calculating part 12.

The receiving part 11B may acquire and track the positioning signal, and calculate a pseudo range $\rho_B$ for every positioning signal (every positioning satellite). The receiving part 11B may output the pseudo range $\rho_B$ to the operation part 13. The receiving part 11B may calculate a carrier phase measurement $PY_B$ for every positioning signal (every positioning satellite). The receiving part 11B may output the carrier phase measurements $PY_B$ to the phase difference calculating part 12.

The receiving part 11C may acquire and track the positioning signal, and calculate a pseudo range $\rho_C$ for every positioning signal (every positioning satellite). The receiving part 11C may output the pseudo range $\rho_C$ to the operation part 13. The receiving part 11C may calculate a carrier phase measurement $PY_C$ for every positioning signal (every positioning satellite). The receiving part 11C may output the carrier phase measurements $PY_C$ to the phase difference calculating part 12.

The receiving part 11D may acquire and track the positioning signal, and calculate a pseudo range $\rho_D$ for every positioning signal (every positioning satellite). The receiving part 11D may output the pseudo range $\rho_D$ to the operation part 13. The receiving part 11D may calculate a carrier phase measurement $PY_D$ for every positioning signal (every positioning satellite). The receiving part 11D may output the carrier phase measurements $PY_D$ to the phase difference calculating part 12.

These pseudo ranges $\rho_A$, $\rho_B$, $\rho_C$ and $\rho_D$, and the carrier phase measurements $PY_A$, $PY_B$, $PY_C$ and $PY_D$ may correspond to data for calculation of the present disclosure.

The phase difference calculating part 12 may set the base line combining two of the antennas 100A, 100B, 100C and 100D. The phase difference calculating part 12 may calculate a single phase difference for every base line. For example, specifically, the phase difference calculating part 12 may execute the following processing.

The phase difference calculating part 12 may set the base line using the antenna 100A as a reference antenna. The phase difference calculating part 12 may calculate a difference between the carrier phase measurement $PY_A$ and the carrier phase measurement $PY_B$ to calculate a single phase difference $\Delta\zeta_{AB}$ between the antennas (=$PY_B$−$PY_A$) for the base line of the antennas 100A and 100B. The phase difference calculating part 12 may calculate the single phase difference for every base line by the difference calculation of the carrier phase measurements. The phase difference calculating part 12 may output the calculated single phase difference to the operation part 13.

The operation part 13 may analyze a navigation message superimposed with the positioning signal to acquire a satellite position. The operation part 13 may acquire at least the position of the positioning satellite which is a sender of the positioning signal received by the receiving parts 11A, 11B, 11C and 11D. Note that each of the receiving parts 11A, 11B, 11C and 11D may perform the analysis of the navigation message and the acquisition of the position of the positioning satellite.

Moreover, the operation part 13 may calculate positions $PO_A$, $PO_B$, $PO_C$ and $PO_D$ of the antennas 100A, 100B, 100C and 100D using the pseudo ranges $\rho_A$, $\rho_B$, $\rho_C$ and $\rho_D$. The positions $PO_A$, $PO_B$, $PO_C$ and $PO_D$ of the antennas 100A, 100B, 100C and 100D may be calculated by using a known single positioning technique.

The attitude angle calculating part 131 may calculate a direction cosine for every single phase difference between the antennas using the satellite position and the antenna positions $PO_A$, $PO_B$, $PO_C$ and $PO_D$. Specifically, for example, the attitude angle calculating part 131 may calculate the direction cosine corresponding to the single phase difference between the antennas 100A and 100B by using the antenna positions $PO_A$ and $PO_B$, and the satellite position of the positioning satellite which is the sender of the positioning signal received by both the antennas 100A and 100B. The attitude angle calculating part 131 may also calculate a direction cosine corresponding to a single phase difference between other antennas by a similar way.

The attitude angle calculating part 131 may calculate an attitude angle AT using the single phase differences and a matrix of the direction cosines between the antennas. The directional cosine matrix may be a matrix for converting the BODY coordinate system into an absolute coordinate system, such as an earth coordinate system. The attitude angle AT may be comprised of a roll angle $\varphi$, a pitch angle $\theta$, and a yaw angle $\psi$. Note that, as the attitude angle AT, at least the yaw angle $\psi$ may be estimated.

More specifically, the attitude angle calculating part 131 may estimate and determine an integral value bias for every single phase difference between the antennas using a known method, such as the LAMDA method. The attitude angle calculating part 131 may calculate a geometric distance difference corresponding to each single phase difference between the antennas using the single phase difference and the integral value bias between the antennas. The attitude angle calculating part 131 may calculate the attitude angle AT by applying a least-squares method etc. using the geometric distance difference and the directional cosine matrix.

The attitude angle calculating part 131 may calculate the attitude angle using a contribution for every single phase difference determined by the calculating condition determining part 132. As the contribution, it may be a weight coefficient, for example. Thus, the attitude angle calculating part 131 may apply the least-squares method etc. in a state where the weight coefficient determined by the calculating condition determining part 132 is applied to the single phase difference, to calculate the attitude angle.

The calculating condition determining part 132 may determine a contribution (for example, a weight coefficient) according to a target component of the attitude angle based on a spatial relationship between the base line of each single phase difference and the positioning satellite. That is, the calculating condition determining part 132 may determine the contribution for every single phase difference, based on which angle among the roll angle $\varphi$, the pitch angle $\theta$, and the yaw angle $\psi$ is to be calculated with high precision. The contribution may be an index of contribution to calculation accuracy of the attitude angle component. More specifically, the contribution may be an index which may be set so that the calculation accuracy of the attitude angle component is higher as the contribution increases. Here, the contribution may correspond to the weight coefficient. The contribution may become higher as the weight coefficient increases, whereas the contribution may become lower as the weight coefficient decreases.

Figure 4:
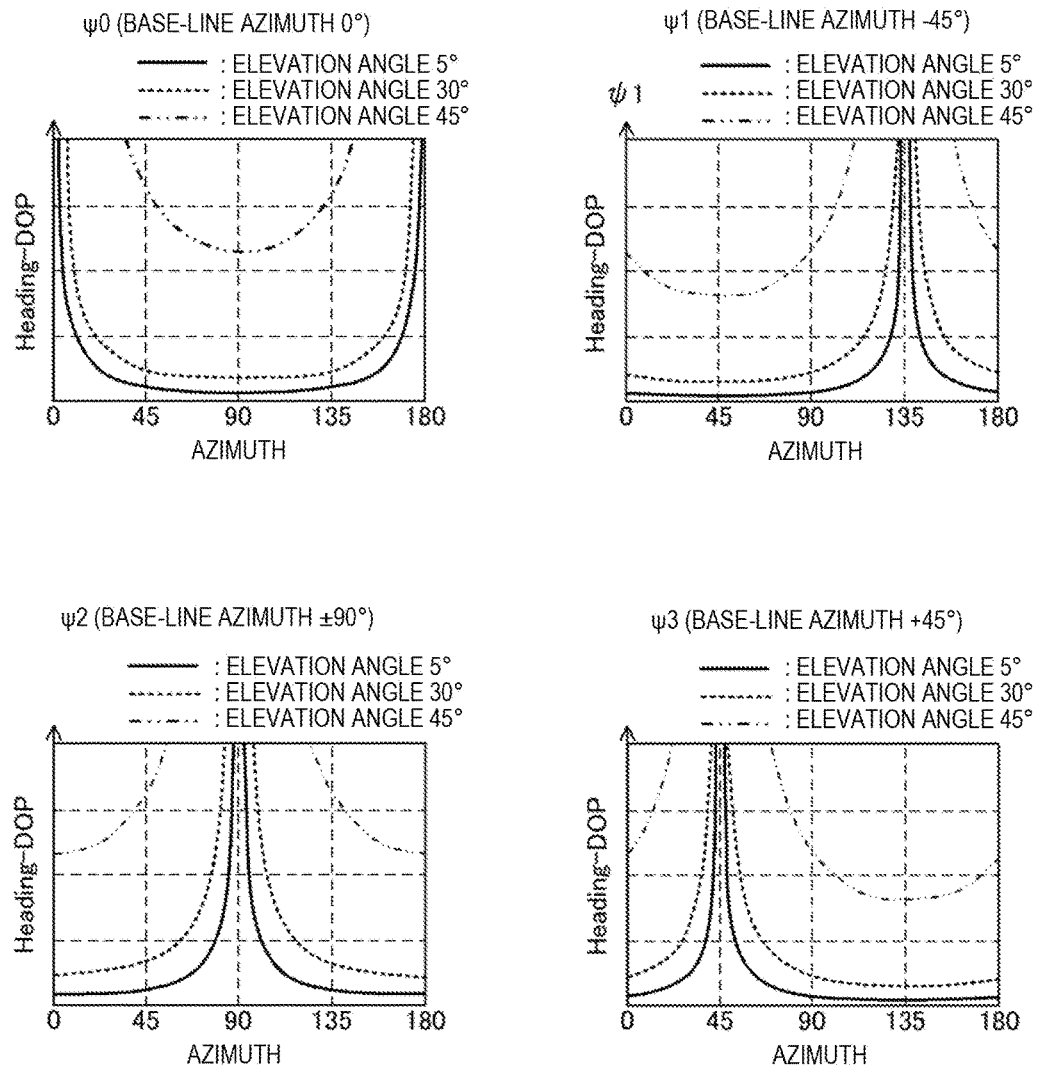
FIG. 4 illustrates graphs of an azimuthal dependence of an accuracy degradation index in a heading direction (Heading-DOP).
Figure 5:
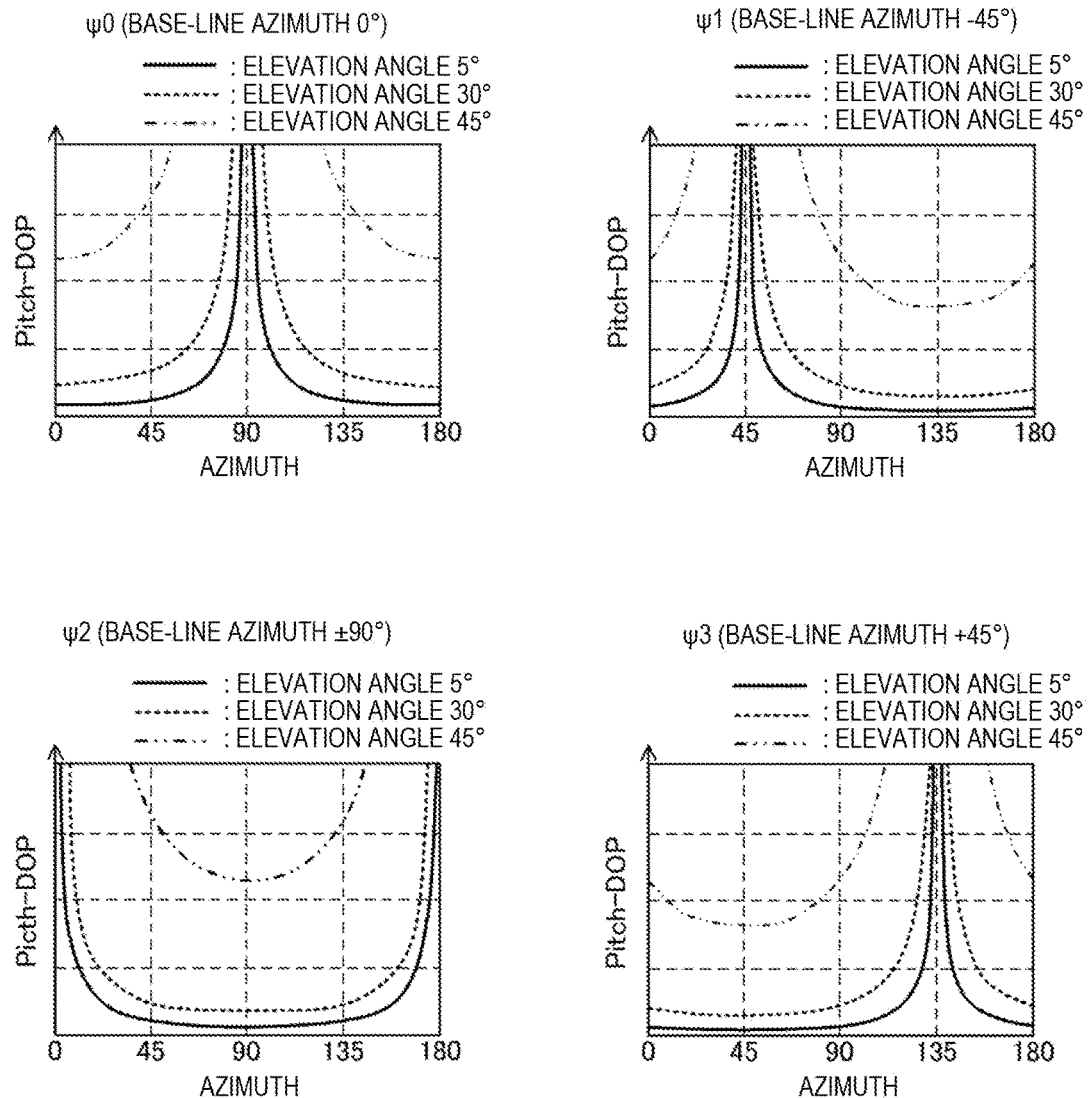
FIG. 5 illustrates graphs of an azimuthal dependence of an accuracy degradation index in a pitch direction (Pitch-DOP).

More specifically, the calculating condition determining part 132 may determine the contribution (weight coefficient) for every single phase difference using the following concept. FIG. 4 illustrates graphs of an azimuthal dependence of the accuracy degradation index in the heading direction (Heading-DOP). FIG. 5 illustrates graphs of the azimuthal dependence of the accuracy degradation index in the pitch direction (Pitch-DOP). In FIGS. 4 and 5, the horizontal axis is an azimuth of the positioning satellite based on the reference position of the base line in the absolute coordinate system, and the base-line azimuths $\psi 0$, $\psi 1$, $\psi 2$ and $\psi 3$ in the respective graphs indicate an azimuth in the absolute coordinate system of the base line from which the single phase difference is calculated.

(Calculation of Yaw Angle $\psi$)

As illustrated in FIG. 4, the nearer to 90° (right angle) with respect to the azimuth of the base line, the smaller the accuracy degradation index in the heading direction (hereinafter, referred to as "the Heading-DOP") becomes. The nearer to 0° (parallel) with respect to the azimuth of the base line, the more sharply the Heading-DOP increases. This azimuthal dependence of the Heading-DOP may not depend on an angle of elevation of the positioning satellite. Moreover, the Heading-DOP decreases as the angle of elevation of the positioning satellite decreases.

The calculating condition determining part 132 may determine the weight coefficient which may be set for the calculation of the yaw angle ψ or the attitude angle containing the yaw angle ψ as the attitude angle component, by using the Heading-DOP. The calculating condition determining part 132 may set a larger weight coefficient as the Heading-DOP decreases, and a smaller weight coefficient as the Heading-DOP increases. The calculating condition determining part 132 may set the weight coefficient for every combination of the base line and the positioning satellite. Thus, the contribution of the single phase difference in the calculation of the attitude angle may increase for a combination of the base line having a smaller Heading-DOP and the positioning satellite, whereas the contribution of the single phase difference in the calculation of the attitude angle may decrease for a combination of the base line having a larger Heading-DOP and the positioning satellite. The calculating condition determining part 132 may output the set weight coefficient to the attitude angle calculating part 131. The attitude angle calculating part 131 may calculate the yaw angle ψ with high precision by calculating the attitude angle using the weight coefficient given from the calculating condition determining part 132.

(Calculation of Pitch Angle θ)

As illustrated in FIG. 5, the nearer to 0° (parallel) with respect to the azimuth of the base line, the smaller the accuracy degradation index in the pitch direction (hereinafter, referred to as "Pitch-DOP") becomes. The nearer to 90° (right angle) with respect to the azimuth of the base line, the more sharply the Pitch-DOP increases. The azimuthal dependence of the Pitch-DOP does not depend on the angle of elevation of the positioning satellite. Moreover, the Pitch-DOP decreases as the angle of elevation of the positioning satellite decreases.

The calculating condition determining part 132 may determine the weight coefficient which may be set for the calculation of the pitch angle θ or the attitude angle containing the pitch angle θ as the attitude angle component, by using the Pitch-DOP. The calculating condition determining part 132 may set a larger weight coefficient as the Pitch-DOP decreases, whereas a smaller weight coefficient as the Pitch-DOP increases. The calculating condition determining part 132 may set the weight coefficient for every combination of the base line and the positioning satellite. Thus, the contribution of the single phase difference in the calculation of the attitude angle may increase for a combination of the base line having a smaller Pitch-DOP and the positioning satellite, whereas the contribution of the single phase difference in the calculation of the attitude angle may decrease for a combination of the base line having a larger Pitch-DOP and the positioning satellite. The calculating condition determining part 132 may output the set weight coefficient to the attitude angle calculating part 131. The attitude angle calculating part 131 may calculate the pitch angle θ with high precision by calculating the attitude angle using the weight coefficient given from the calculating condition determining part 132.

Thus, by using the configuration of this embodiment, the target attitude angle component may be calculated with high precision.

Note that in the above configuration, the example is illustrated in which the weight coefficient may be set for every combination of the base line and the positioning satellite by using the accuracy degradation index. However, as illustrated below, the weight coefficient may be set using a base-line vector and a line-of-sight vector of the positioning satellite from the base line.

Therefore, when calculating the attitude angle (yaw angle) in the heading direction, the weight for the positioning satellite which is located at a position closer to 90° (right angle) with respect to the azimuth of the base line may be made greater, on the basis of the arrangement spatial relationship of the positioning satellites. Alternatively, when calculating the attitude angle in the heading direction (the azimuth of the movable body or the yaw angle), the positioning satellite which is located at a position closer to 90° (right angle) with respect to the azimuth of the base line may be selected, and the positioning satellites which are located at positions closer to 0° (parallel) with respect to the azimuth of the base line may be excluded. The calculation accuracy of the yaw angle may be improved by performing such settings.

Figure 6:
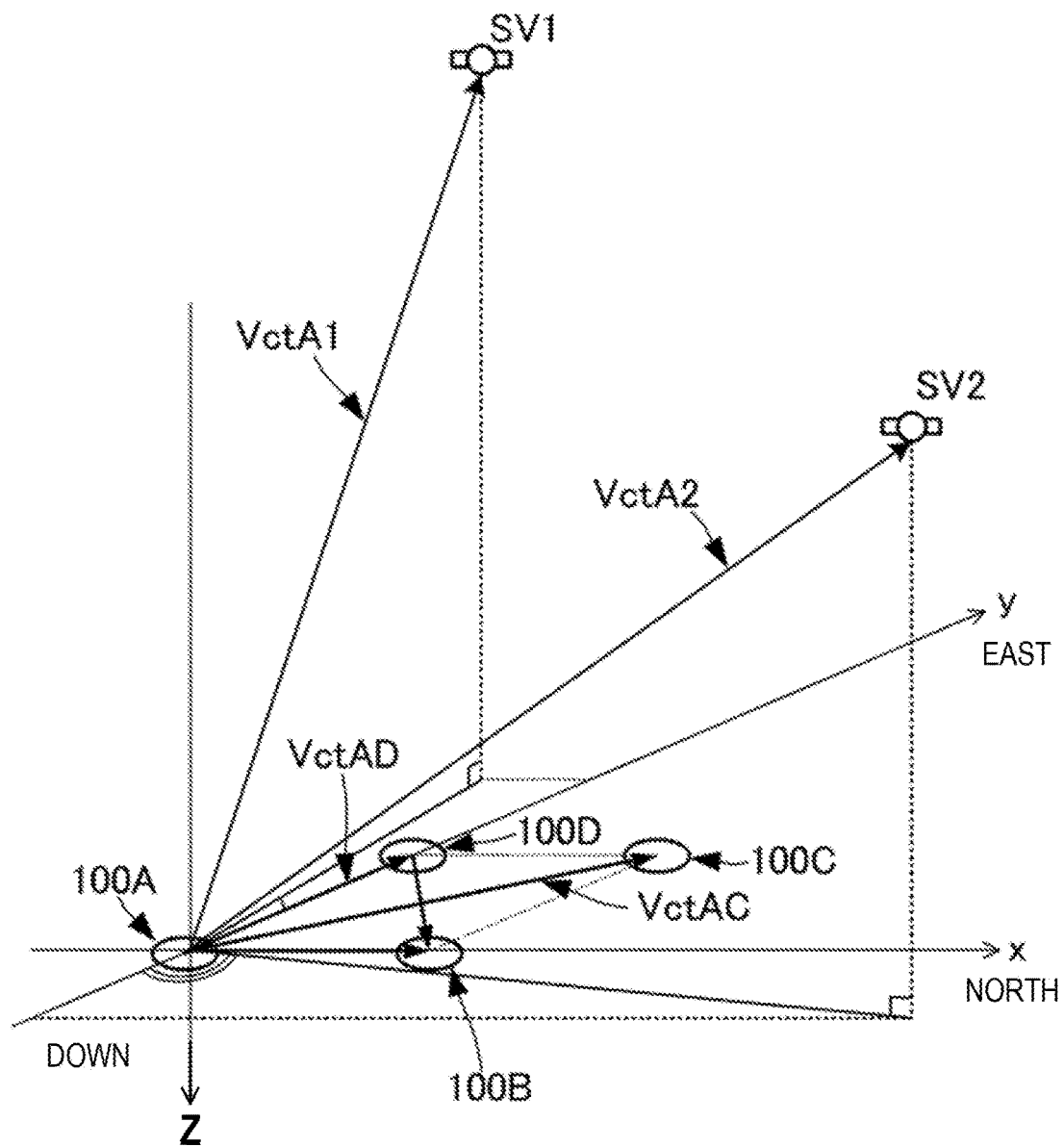
FIG. 6 is a perspective view illustrating a spatial relationship between the antennas and the positioning satellites.
Figure 7:
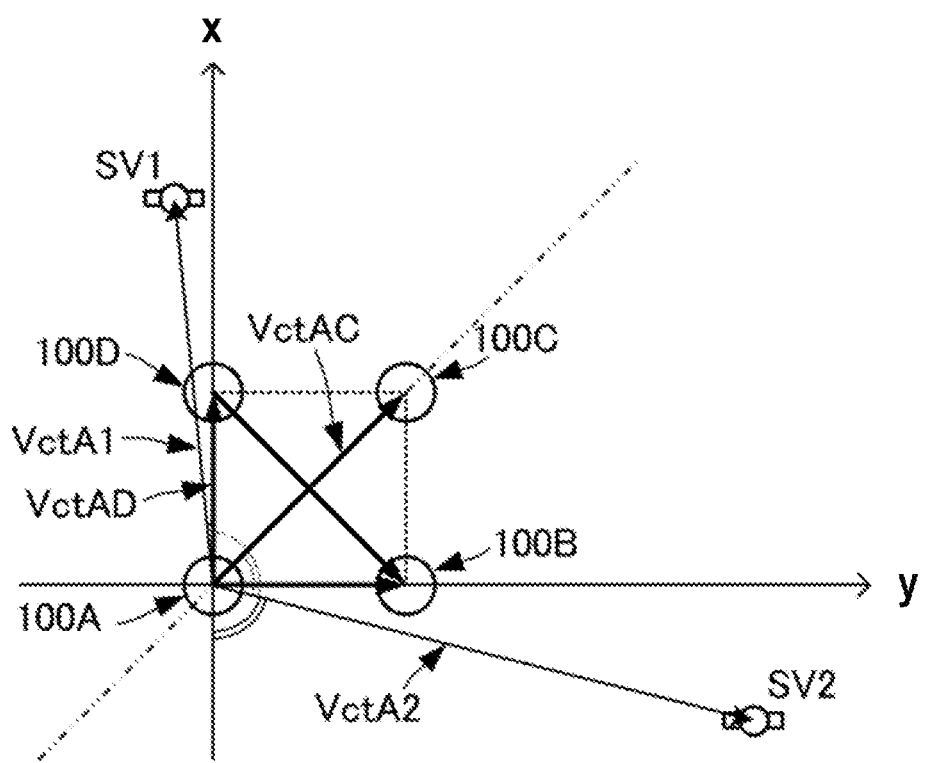
FIG. 7 is a plan view illustrating a relation between the antennas and projected positions of the positioning satellites.

Specifically, the calculating condition determining part 132 may determine the contribution for every single phase difference using the following concept. FIG. 6 is a perspective view illustrating a spatial relationship of the antennas and the positioning satellites. FIG. 7 is a plan view illustrating a relation between the antennas and projected positions of the positioning satellites. Note that, FIGS. 6 and 7 illustrate a case where the Bx-axis direction of the BODY coordinate system is in agreement with and x-axis direction of the absolute coordinate system, whereas the By-axis direction of the BODY coordinate system is in agreement with y-axis direction of the absolute coordinate system.

The calculating condition determining part 132 may calculate the spatial relationship of the base line and the positioning satellite. The calculating condition determining part 132 may calculate an angle between the base line and a line connecting the projected position of the positioning satellite to a plane including the base line (in the case of FIGS. 6 and 7, the x-y plane), and a reference position of the base line (in the case of FIGS. 6 and 7, a starting point of the base line).

For example, in the example illustrated in FIG. 7, the calculating condition determining part 132 may set a base-line vector VctAD connecting the antennas 100A and 100D. The base-line vector VctAD may be determined by the positions of the antennas 100A and 100D. The positions of the antennas 100A and 100D may be calculated by the independent positioning based on the pseudo ranges $\rho_A$ and $\rho_D$.

The calculating condition determining part 132 may set a line-of-sight direction vector VctA1 connecting the antenna 100A with a positioning satellite SV1. The line-of-sight direction vector VctA1 may be determined based at the positions of the antenna 100A and the positioning satellite SV1. The position of the positioning satellite SV1 may be acquired by analyzing the navigation message.

The calculating condition determining part 132 may set a line-of-sight direction vector VctA2 connecting the antenna 100A with a positioning satellite SV2. The line-of-sight direction vector VctA2 may be determined based at the positions of the antenna 100A and the positioning satellite SV2. The position of the positioning satellite SV2 may be acquired by analyzing the navigation message.

The calculating condition determining part 132 may use an inner product operation etc. of the base-line vector VctAD and the line-of-sight direction vector VctA1 to calculate an angle between the base line connecting the antennas 100A and 100D, and a line connecting the projected position of the positioning satellite SV1 and the reference position of the base line (in the case of FIGS. 4 and 5, the position of the antenna 100A). Similarly, the calculating condition determining part 132 may use an inner product operation etc. of the base-line vector VctAD and the line-of-sight direction vector VctA2 to calculate an angle between the base line connecting the antennas 100A and 100D, and a line connecting the projected position of the positioning satellite SV2 and the reference position of the base line. Here, the angles may be calculated as 90° or less.

(Calculation of Yaw Angle $\psi$)

As illustrated in FIG. 4, in the case of the yaw angle $\psi$, the Heading-DOP decreases as the angle with respect to the base line becomes closer to 90° (right angle), whereas the Heading-DOP increases as the angle with respect to the base line becomes closer to 0° (parallel).

Using this principle, the calculating condition determining part 132 may set a larger weight coefficient for the positioning satellite as the angle with respect to the base line becomes closer to 90° (right angle), whereas set a smaller weight coefficient for the positioning satellite as the angle with respect to the base line becomes closer to 0° (parallel).

Thus, the yaw angle $\psi$ may be calculated with high precision similar to the settings of the weight coefficients using the Heading-DOP.

(Calculation of Pitch Angle $\theta$)

As illustrated in FIG. 5, in the case of the pitch angle $\theta$, Pitch-DOP decreases as the angle with respect to the base line becomes closer to 0° (parallel), whereas the Pitch-DOP increases as the angle with respect to the base line becomes closer to 90° (right angle).

Using this principle, the calculating condition determining part 132 may set a larger weight coefficient for the positioning satellite as the angle with respect to the base line becomes closer to 0° (parallel), whereas set a smaller weight coefficient for the positioning satellite as the angle with respect to the base line becomes closer to 90° (right angle).

Thus, the yaw angle $\psi$ may be calculated with high precision similar to the settings of the weight coefficients using the Pitch-DOP.

Note that, in the above description, although the weight coefficient may be set based on the angle with respect to the base line, the angle of elevation may further be used. As illustrated in FIGS. 4 and 5, the Heading-DOP and the Pitch-DOP are improved as the angle of elevation becomes lower. Therefore, a correction to increase the weight coefficient may be performed as the angle of elevation becomes lower, and a correction to decrease the weight coefficient may be performed as the angle of elevation becomes higher.

Figure 8:
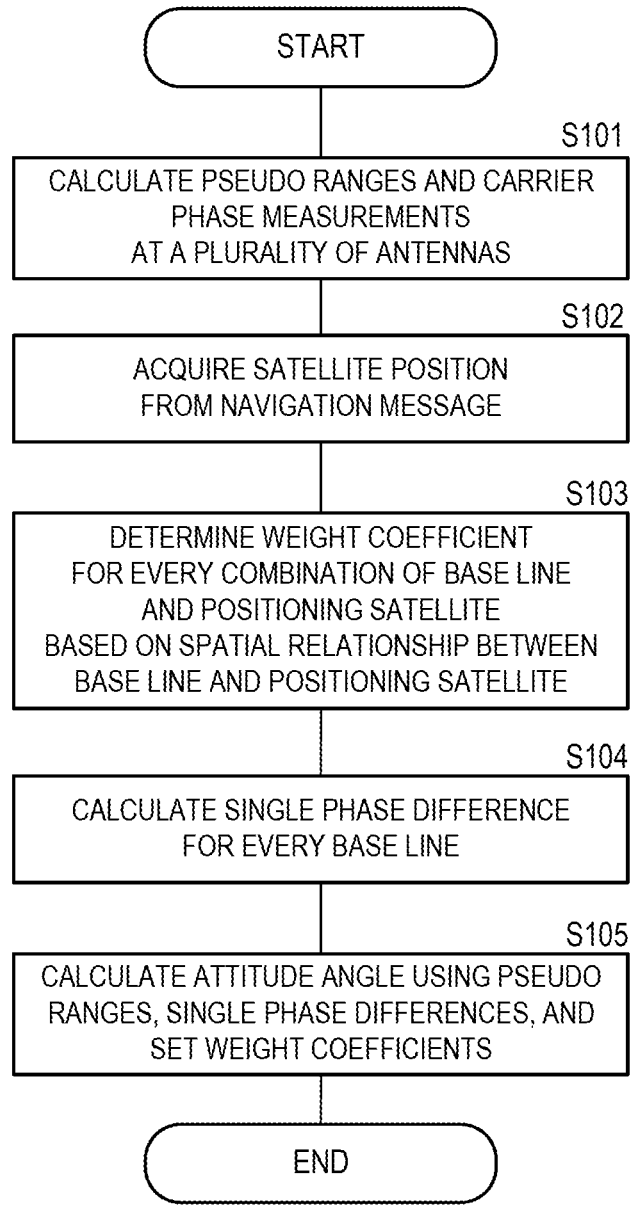
FIG. 8 is a flowchart illustrating a processing flow of a method of calculating a traveling state according to the first embodiment of the present disclosure.

Although in the above description, the mode in which each processing may be performed by an individual functional part, the processing may be programmed and stored in a storage medium, and this program may be read and executed by an information processing device, such as a computer. In this case, the following processing flow may be executed. FIG. 8 is a flowchart illustrating a processing flow of a method of calculating a traveling state according to the first embodiment of the present disclosure.

The information processing device may calculate the pseudo ranges and the carrier phase measurements based at the positioning signals received by the plurality of antennas 100A, 100B, 100C and 100D (S101).

The information processing device may demodulate the received positioning signals and analyze the navigation message. The information processing device may acquire the satellite position from the navigation message (S102).

Figure 9:
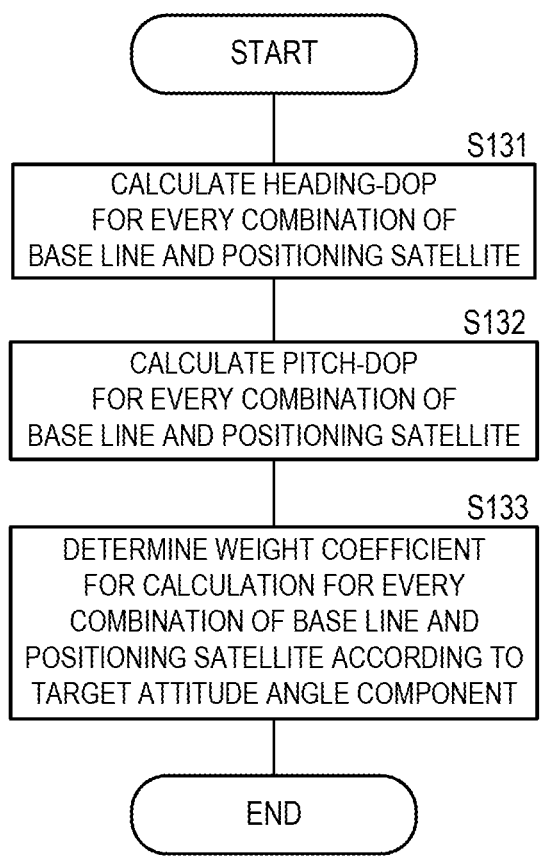
FIG. 9 is a flowchart illustrating determination processing of weight coefficients in the method of calculating the traveling state according to the first embodiment of the present disclosure.

The information processing device may determine the weight coefficient for every combination of the base line and the positioning satellite based on the spatial relationship between the positioning satellite and the base line (S103). Specifically, the information processing device may determine the weight coefficient using the processing illustrated in FIG. 9. FIG. 9 is a flowchart illustrating determination processing of the weight coefficient in the method of calculating the traveling state according to the first embodiment of the present disclosure. The information processing device may calculate the Heading-DOP for every combination of the base line and the positioning satellite (S131). The information processing device may calculate the Pitch-DOP for every combination of the base line and the positioning satellite (S132). The information processing device may determine the weight coefficient for every combination of the base line and the positioning satellite using the Heading-DOP or the Pitch-DOP according to the target attitude angle component (S133). The specific determination method of the weight coefficient is the same as the description of the above configuration. Note that one of the Heading-DOP and the Pitch-DOP may be calculated according to the target attitude angle component. Specifically, if the attitude angle component for which the highly-precise calculation is needed is the yaw angle $\psi$, only the Heading-DOP may be calculated to determine the weight coefficient based on the Heading-DOP. Moreover, if the attitude angle component for which the highly-precise calculation is needed is the pitch angle $\theta$, only the Pitch-DOP may be calculated to determine the weight coefficient based on the Pitch-DOP.

The information processing device may calculate the single phase difference between the antennas for every base line (S104). The information processing device may calculate the attitude angle using the pseudo range, the single phase difference and the weight coefficient set for every single phase difference (S105).

Note that in the above description, the mode is illustrated in which the weight coefficient for the calculation of the attitude angle may be determined based on the accuracy degradation index, or the spatial relationship of the base-line vector and the line-of-sight vector. However, the combination of the base line and the positioning satellite to be used for the calculation of the attitude angle may be selected from the accuracy degradation index, or the spatial relationship of the base-line vector and the line-of-sight vector.

Figure 10:
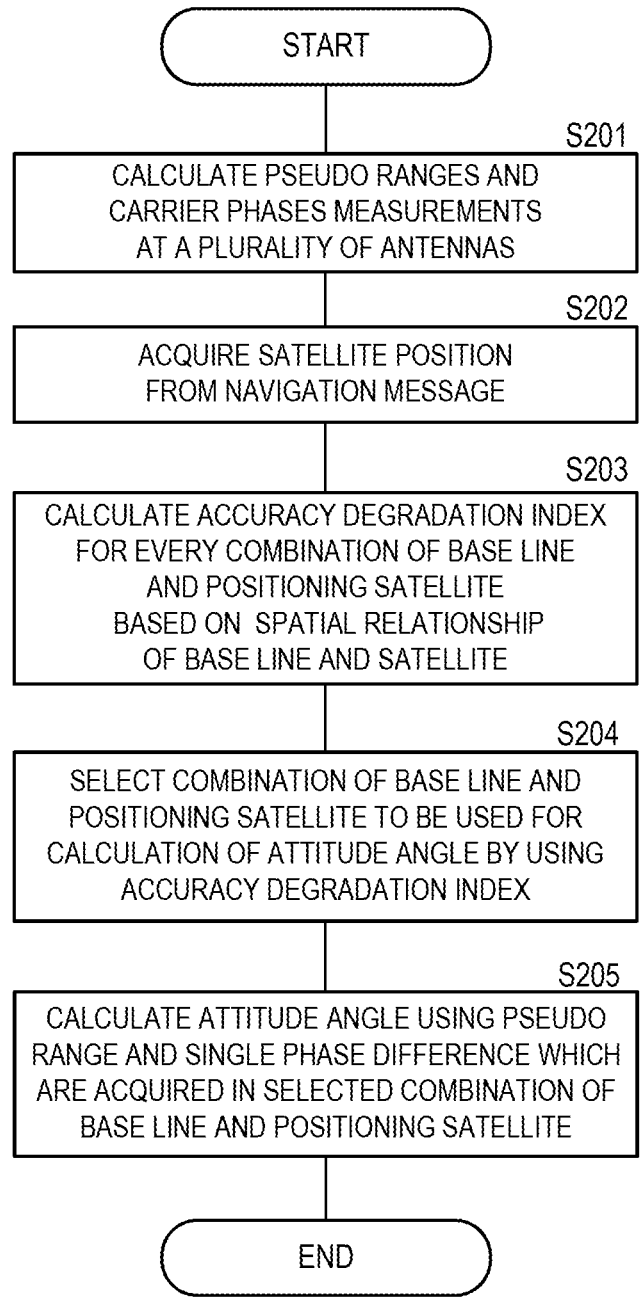
FIG. 10 is a flowchart illustrating another processing flow of the method of calculating the traveling state according to the first embodiment of the present disclosure.

FIG. 10 is a flowchart illustrating another processing flow of the method of calculating the traveling state according to the first embodiment of the present disclosure. FIG. 10 illustrates the case where the accuracy degradation index may be used.

The information processing device may calculate the pseudo range and the carrier phase measurements based at the positioning signals received by the plurality of antennas 100A, 100B, 100C and 100D (S201).

The information processing device may demodulate the received positioning signals and analyze the navigation message. The information processing device may acquire the satellite position from the navigation message (S202).

The information processing device may calculate the accuracy degradation index for every combination of the base line and the positioning satellite based on the spatial relationship of the positioning satellite and the base line (S203).

The information processing device may select the combination of the base line and the positioning satellite to be used for the calculation of the attitude angle by using the accuracy degradation index (S204). Specifically, the information processing device may set a threshold beforehand to the accuracy degradation index. If the accuracy degradation index is below the threshold, the information processing device may select the combination of the base line and the positioning satellite to be used as the accuracy degradation index so that the combination may be used for the calculation processing of the attitude angle. If the accuracy degradation index is above the threshold, the information processing device may select the combination of the base line and the positioning satellite to be used as the accuracy degradation index so that the combination may be excluded from the calculation processing of the attitude angle. This selection processing differs depending on the target attitude angle component, and the Heading-DOP may be used when calculating the yaw angle $\psi$, whereas the Pitch-DOP may be used when calculating the pitch angle $\theta$.

Note that, when using the spatial relationship of the base-line vector and the line-of-sight vector, the information processing device may set the threshold to the angle between the base-line vector and the line-of-sight vector.

If the angle is above the threshold, the information processing device may select the combination of the base line and the positioning satellite which constitute the angle so that the combination may be used for the calculation processing of the yaw angle $\psi$. If the angle is below the threshold, the information processing device may select the combination of the base line and the positioning satellite which constitute the angle so that the combination may be excluded from the calculation processing of the yaw angle $\psi$. That is, the contribution to the calculation processing of the yaw angle $\psi$ may be set to 0. On the other hand, if the angle is below the threshold, the information processing device may select the combination of the base line and the positioning satellite which constitute the angle so that the combination may be used for the calculation processing of the pitch angle $\theta$. If the angle is above the threshold, the information processing device may select the combination of the base line and the positioning satellite which constitute the angle so that the combination may be excluded from the calculation processing of the pitch angle $\theta$. That is, the contribution to the calculation processing of the yaw angle $\psi$ may be set to 0.

The information processing device may calculate the attitude angle using the pseudo range and the single phase difference which are acquired in the selected combination of the base line and the positioning satellite [S205].

Note that such a selection of the combination of the base line and the positioning satellite may be executed by the calculating condition determining part 132 in the mode where each processing is executed by every functional part.

By using such a processing and configuration, the target attitude angle component (i.e., the attitude angle component for which the highly-precise calculation is needed) may be calculated with high precision.

Note that the calculation of the attitude angle using the weight coefficient, and the calculation of the attitude angle using the selection may suitably be adopted according to situations. For example, if the number of positioning satellites which may receive the positioning signals is less, the weight coefficient may be used. Thus, the attitude angle may be calculated with high precision, even if the positioning satellites which may receive the positioning signals are less in the number. On the other hand, if the number of positioning satellites which may receive the positioning signals is more, the selection may be used. Thus, the attitude angle may be calculated with high precision by only using the positioning satellites among a great number of positioning satellites by which the calculation accuracy of the attitude angle is improved.

Figure 11:
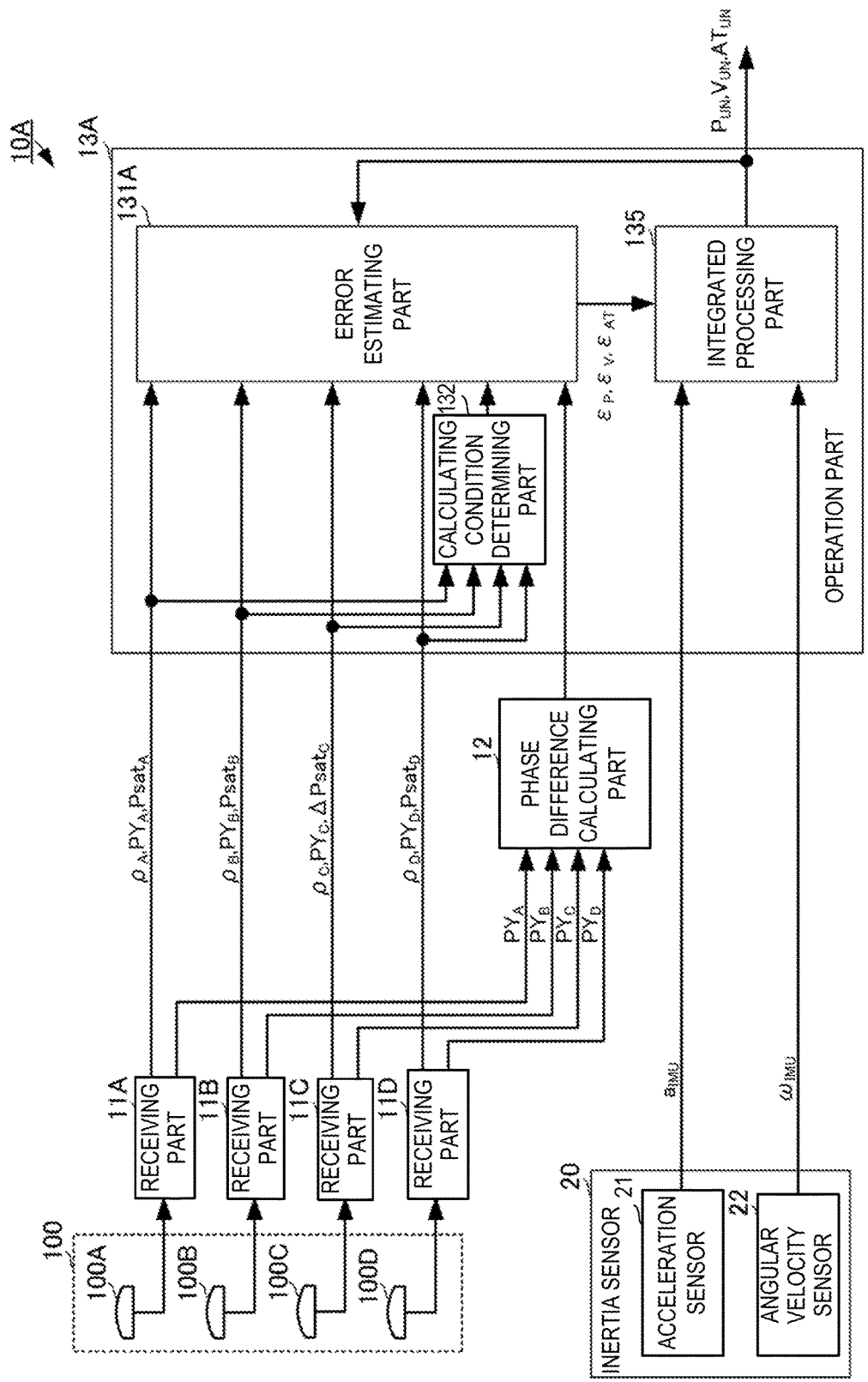
FIG. 11 is a block diagram illustrating a configuration of a traveling state calculating device according to a second embodiment of the present disclosure.

Next, a traveling state calculating device, a method of calculating the traveling state, and a traveling state calculating program according to a second embodiment are described with reference to the accompanying drawings. FIG. 11 is a block diagram illustrating a configuration of the traveling state calculating device according to the second embodiment of the present disclosure.

A traveling state calculating device 10A according to this embodiment is configured by adding an inertia sensor 20 to the traveling state calculating device 10 according to the first embodiment. Furthermore, the traveling state calculating device 10A differs in the configuration of an operation part 13A from the traveling state calculating device 10.

The inertia sensor 20 may include an acceleration sensor 21 and an angular velocity sensor 22. The acceleration sensor 21 may detect an acceleration $a_{IMU}$ and output it to an integrated processing part 135. The angular velocity sensor 22 may detect an angular velocity $\omega_{IMU}$ and output it to the integrated processing part 135.

The operation part 13A may include an error estimating part 131A, a calculating condition determining part 132, and the integrated processing part 135. The calculating condition determining part 132 may have the same configuration and perform the same processing as those of the first embodiment, and determine the weight coefficient to the single phase difference for every combination of the base line and the positioning satellite.

The error estimating part 131A may accept inputs of the pseudo ranges $\rho_A$, $\rho_B$, $\rho_C$ and $\rho_D$, the carrier phase measurements $PY_A$, $PY_B$, $PY_C$ and $PY_D$, amounts of change in the satellite position $\Delta Psat_A$, $\Delta Psat_B$, $\Delta Psat_C$ and $\Delta Psat_D$, and the single phase differences between the antennas. The single phase difference between the antennas is calculated by the phase difference calculating part 12. Moreover, the error estimating part 131A accepts inputs of a previous integrated position $P_{UN}$, a previous integrated speed $V_{UN}$, and a previous integrated attitude angle $\Delta T_{UN}$.

The error estimating part 131A may set an observation value based on these input values, and set a Kalman filter in which a position calculation error $\epsilon_P$, a speed calculation error $\epsilon_V$, and an attitude angle calculation error $\epsilon_{AT}$ are estimated values. Here, the error estimating part 131A may set the Kalman filter using the weight coefficient set for every single phase difference.

By carrying out the calculation processing of the Kalman filter, the error estimating part 131A may estimate the position calculation error $\epsilon_P$, the speed calculation error $\epsilon_V$, and the attitude angle calculation error $\epsilon_{AT}$, and output them to the integrated processing part 135. In addition, the attitude angle calculation error $\epsilon_{AT}$ may be estimated with high precision by weighting the single phase difference.

The integrated processing part 135 may calculate an integrated position PUN, an integrated speed $V_{UN}$, and an integrated attitude angle $AT_{UN}$ by using the acceleration $a_{IMU}$ and the angular velocity $\omega_{IMU}$. Here, the integrated processing part 135 may perform a correction by the position calculation error $\epsilon_P$, the speed calculation error $\epsilon_V$, and the attitude angle calculation error $\epsilon_{AT}$.

Even such a configuration may be used, the attitude angle may be calculated with high precision similar to the first embodiment. Furthermore, with the configuration of this embodiment, the position and the speed may also be calculated with high precision corresponding to the calculation accuracy of the attitude angle.

Moreover, by using the configuration of this embodiment, the attitude angle may also be calculated during a period in which the positioning signal cannot be received. Moreover, during a period in which the positioning signal is received, since the error of the inertia sensor 20 may be corrected using the positioning signal, the attitude angle may be calculated with high precision.

Note that FIG. 11 illustrates the mode in which each processing may be executed by the different functional part, respectively. However, these functional parts may be formed by a single information processing device. In this case, the following program which implements the method of calculating the traveling state may be stored beforehand, and the information processing device may read and execute this program.

Figure 12:
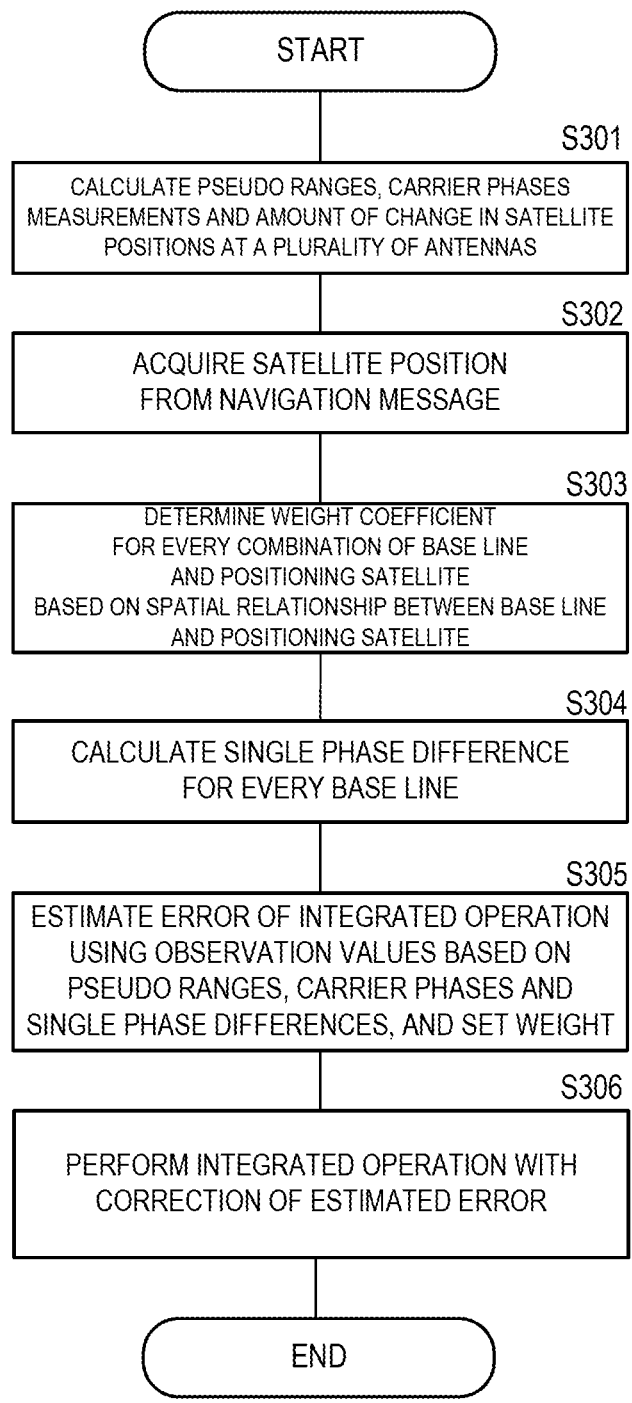
FIG. 12 is a flowchart of a method of calculating a traveling state according to the second embodiment of the present disclosure.

FIG. 12 is a flowchart of the method of calculating the traveling state according to the second embodiment of the present disclosure.

The information processing device may calculate the pseudo range $\rho_A$, $\rho_B$, $\rho_C$ and $\rho_D$, the carrier phase measurements $PY_A$, $PY_B$, $PY_C$ and $PY_D$, and the amount of change in the satellite positions $\Delta Psat_A$, $\Delta Psat_B$, $\Delta Psat_C$, and $\Delta Psat_D$ (S301). The information processing device may acquire the acceleration $a_{IMU}$ and the angular velocity comp from the inertia sensor 20.

The information processing device may demodulate the received positioning signals and analyze the navigation message. The information processing device may acquire the satellite position from the navigation message (S302).

The information processing device may determine the weight coefficient for every combination of the base line and the positioning satellite based on the spatial relationship between the positioning satellite and the base line (S303).

The information processing device may calculate the single phase difference between the antennas for every base line (S304).

The information processing device may estimate the position calculation error $\varepsilon_P$, the speed calculation error $\varepsilon_V$, and the attitude angle calculation error $\varepsilon_{AT}$ using the pseudo range carrier phases and the single phase difference, and the integrated position $P_{UN}$, the integrated speed $V_{UN}$ and the integrated attitude angle $AT_{UN}$ which are obtained from the previous calculation, and the weight coefficient set for the pseudo range, carrier phases and every single phase difference (S305). Here, the information processing device may set the weight to error variance etc. using the Kalman filter etc.

The information processing device may calculate the integrated position PUN, the integrated speed $V_{UN}$, and the integrated attitude angle $AT_{UN}$ using the acceleration $a_{IMU}$, the angular velocity $\omega_{IMU}$, the position calculation error $\varepsilon_P$, the speed calculation error $\varepsilon_V$, and the attitude angle calculation error $\varepsilon_{AT}$ (S306).

Figure 13:
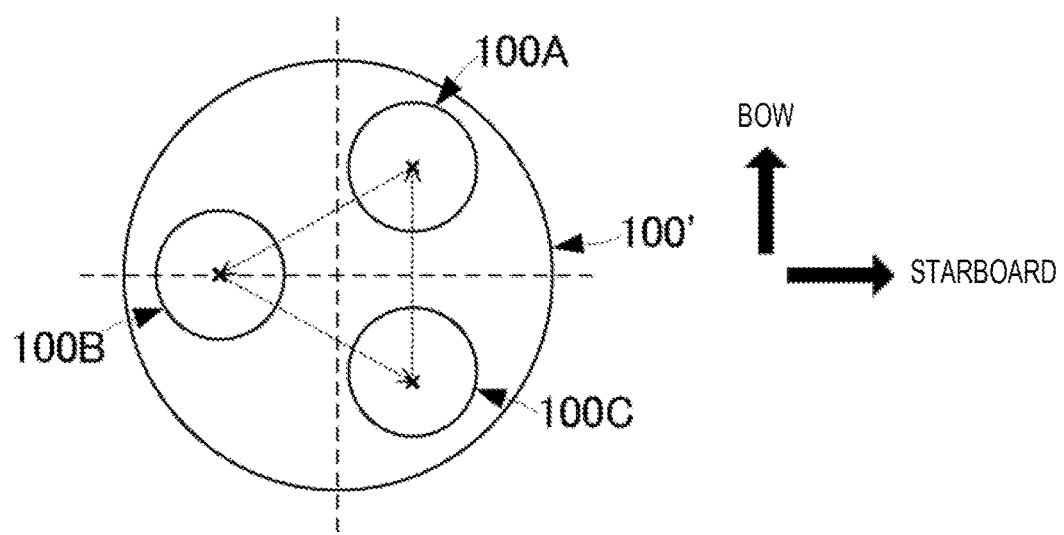
FIG. 13 is a plan view illustrating a pattern of the antennas used for the traveling state calculating device according to the embodiments of the present disclosure.

Although in the traveling state calculating devices 10 and 10A the case where the number of the antennas is four is illustrated, the antennas may be disposed so that the plurality of antennas are provided, i.e., one or more base lines may be formed. FIG. 13 is a plan view illustrating a pattern of the antennas used for the traveling state calculating device according to the embodiments of the present disclosure.

An antenna part 100' may include the antennas 100A, 100B and 100C. An arrangement pattern of the antennas 100A, 100B and 100C may be spread two-dimensionally. That is, the antennas 100A, 100B and 100C may be disposed so that the antenna 100C is not disposed on a straight line passing through the antennas 100A and 100B. The distances between the antennas are the same as the first embodiment.

Even with such a configuration, similar operations and effects to each embodiment may be acquired.

Figure 14:
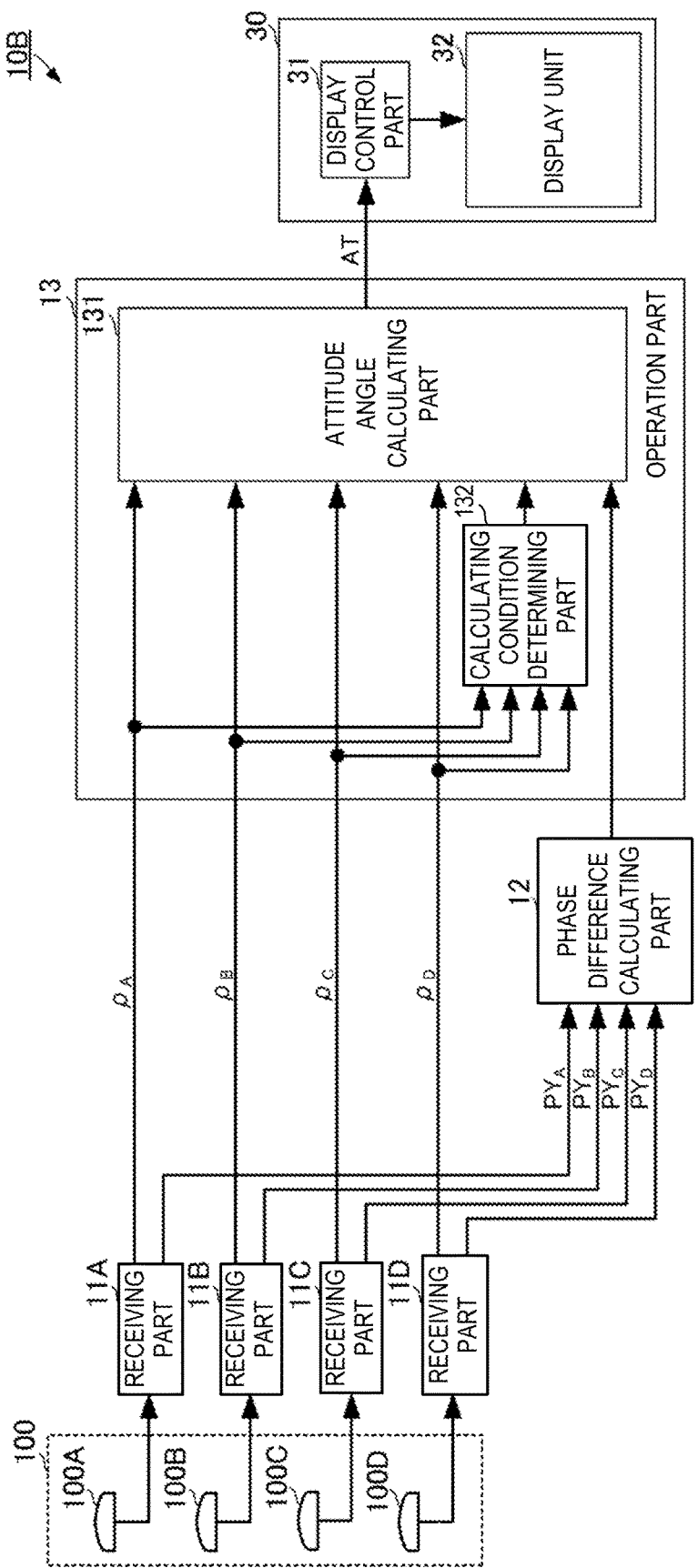
FIG. 14 is a block diagram illustrating a configuration of a traveling state calculating device according to a third embodiment of the present disclosure.

Next, a traveling state calculating device according to the third embodiment of the present disclosure is described with reference to the accompanying drawings. FIG. 14 is a block diagram illustrating a configuration of the traveling state calculating device according to the third embodiment of the present disclosure.

A traveling state calculating device 10B of this embodiment may be configured by adding a display part 30 to the traveling state calculating device 10 according to the first embodiment. Other configurations of the traveling state calculating device 10B may be the same as those of the traveling state calculating device according to the first embodiment.

The display part 30 may include a display control part 31 and a display unit 32. The display control part 31 may accept an input of the attitude angle calculated by the attitude angle calculating part 131. The display control part 31 may accept inputs of the position of the positioning satellite acquired by the demodulation of the navigation message and the position of the antenna part 100 (i.e., position of the ship). The attitude angle, the positions of the positioning satellites, and the position of the ship may be set to a common coordinate system.

The display control part 31 may generate an image data indicative of positions of the antenna part 100 and the positioning satellites based on the attitude angle AT, the positions of the positioning satellite, and the position of the ship. The display control part 31 may output the image data to the display unit 32.

Figure 15:
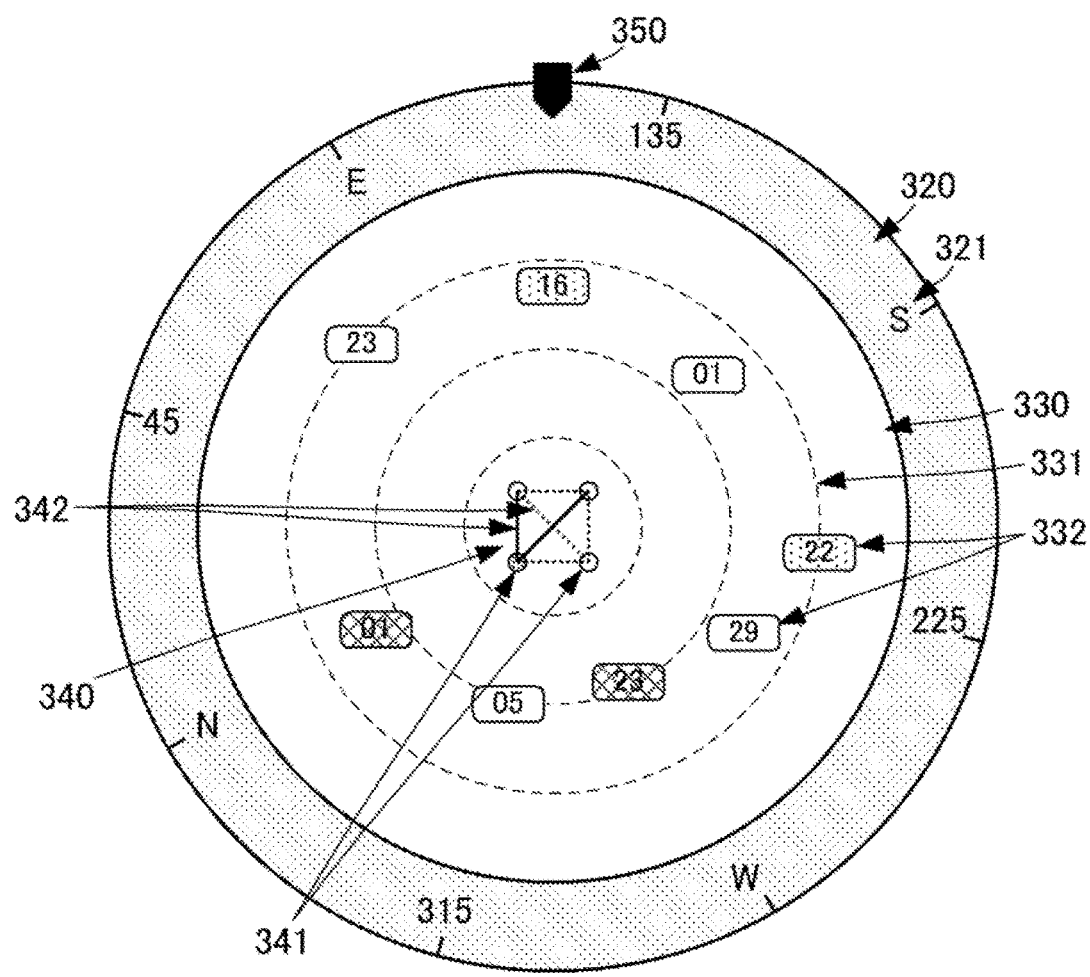
FIG. 15 is a view illustrating one example of the image outputted from the traveling state calculating device according to the third embodiment of the present disclosure.

FIG. 15 is a view illustrating one example of the image outputted from the traveling state calculating device according to the third embodiment of the present disclosure. As illustrated in FIG. 15, the image may include an azimuth display part 320 and a satellite-location display part 330. The azimuth display part 320 and the satellite-location display part 330 may be concentric circles. The satellite-location display part 330 may be disposed inside the circle of the azimuth display part 320.

The azimuth display part 320 may include symbols indicative of directions (azimuths) in the earth coordinate system (N (North), S (South), E (East), W (West), 45, 135, 225 and 315). Each symbol may be located at an interval of 45° along with an outer circumferential circle of the azimuth display part 320. The symbols of 45, 135, 225 and 315 may represent angles in the E (Eastward) with respect to N (North). In the azimuth display part 320, an upward direction of the image may be an azimuth of a reference base line.

The satellite-location display part 330 may be provided with a plurality of angle-of-elevation auxiliary lines 331 comprised of circles of different radii. The plurality of angle-of-elevation auxiliary lines 331 may be concentric circles, and indicating that the angle of elevation increases as the radius of the circle becomes smaller. In the satellite-location display part 330, symbols 332 (positioning satellite symbols) indicative of the positioning satellites may be displayed. The positioning satellite symbol 332 may represent the position of the positioning satellite with respect to the antenna part 100. The position of the positioning satellite may be expressed by the azimuth and the angle of elevation of each positioning satellite when seen from the antenna part 100, which may be obtained from the line-of-sight vector. As for the display position of the positioning satellite symbol 332, a distance from the center of the circle may be determined based on the angle of elevation, and the position along the circumferential direction may be determined based on the azimuth. The positioning satellite symbol 332 may be provided with a numerical value indicative of a satellite number. The positioning satellite symbols 332 may be displayed in different colors depending on their positioning system. Note that the positioning satellite symbol 332 may adopt a display mode in which only the symbols corresponding to the positioning satellites from which the positioning signals are currently received are changed in the displaying color or blinked, etc. Moreover, the display mode of the positioning satellite symbol 332 may be changed according to the antenna which is receiving the positioning signal.

At the center of the display image (i.e., at the center of the azimuth display part 320 and the satellite-location display part 330), symbols 341 (antenna symbols) indicative of the antennas 100A, 100B, 100C and 100D, and symbols 342 (base-line symbols) indicative of the base lines, may be displayed. The antenna symbols 341 and the base-line symbols 342 may be displayed in the same arrangement pattern as the antenna part 100. The antenna symbols 341 and the base-line symbols 342 may be displayed so that the reference base line extends in the vertical directions of the image. Only the antenna symbol 341 of the reference antenna (here, corresponding to the antenna 100A) may be displayed in a different display mode (in color, etc.) from the symbols of other antennas. The base-line symbols 342 may be lines, and the base lines which are used for positioning are displayed by solid lines, whereas the base lines which are not used for positioning are displayed by dotted lines. Note that the antenna and the base line used as the reference may be selected, and the selected antenna and base line may be displayed in a different display mode from other antennas and base lines.

A bow-direction indicating symbol 350 may be displayed in an outer circumference of the azimuth display part 320. The bow-direction indicating symbol 350 is displayed at a position corresponding to a bow direction.

By using such an indication, an operator may visually and easily observe the arrangement of the positioning satellites around traveling state calculating device 10B. The operator may visually and easily observe the spatial relationship of the base lines and the positioning satellites. Moreover, the operator may visually and easily observe the positioning satellites used for the calculation of the attitude angle, and the base lines used as the reference.

Figure 16:
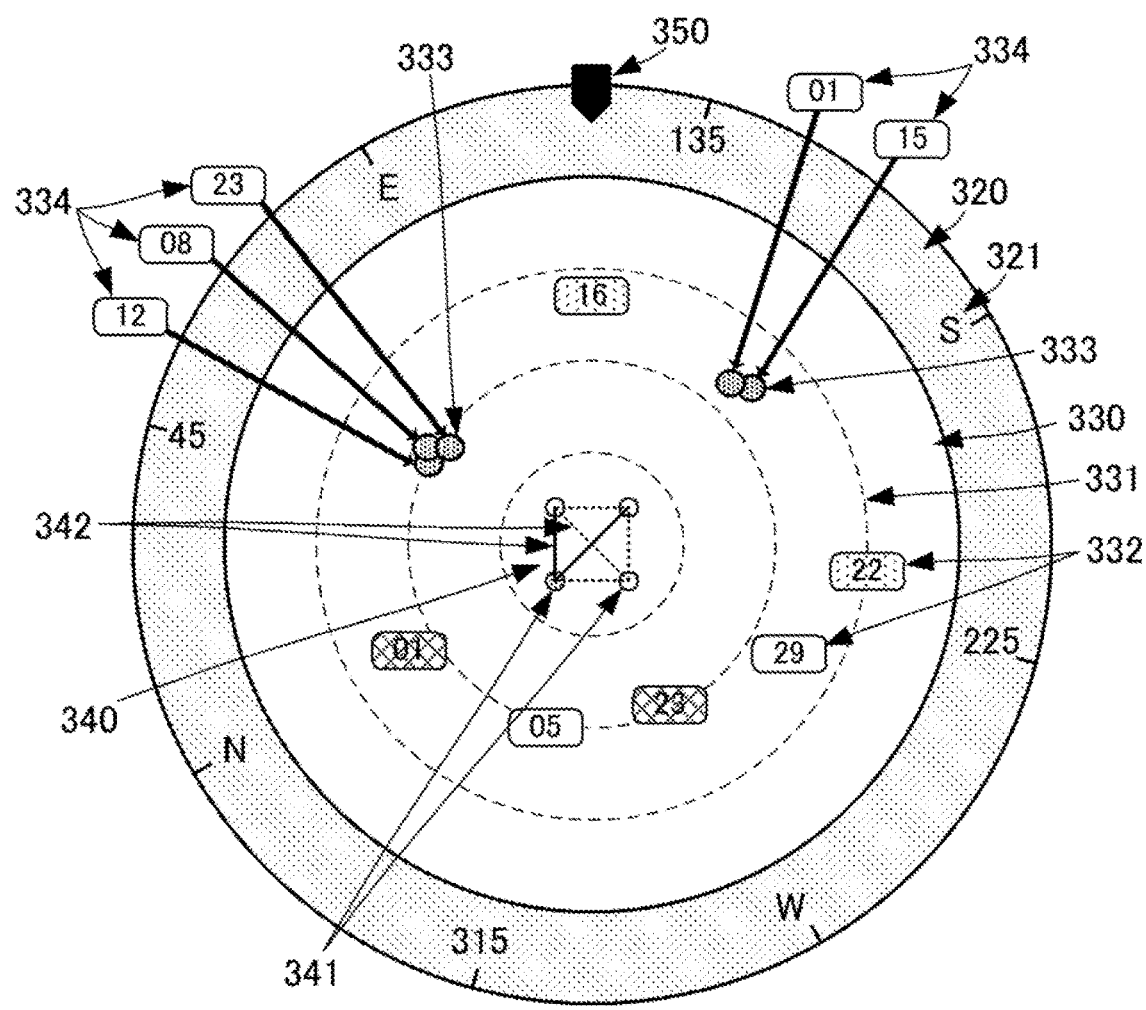
FIG. 16 is a view illustrating a display mode of the traveling state calculating device according to the third embodiment of the present disclosure.
Figure 17:
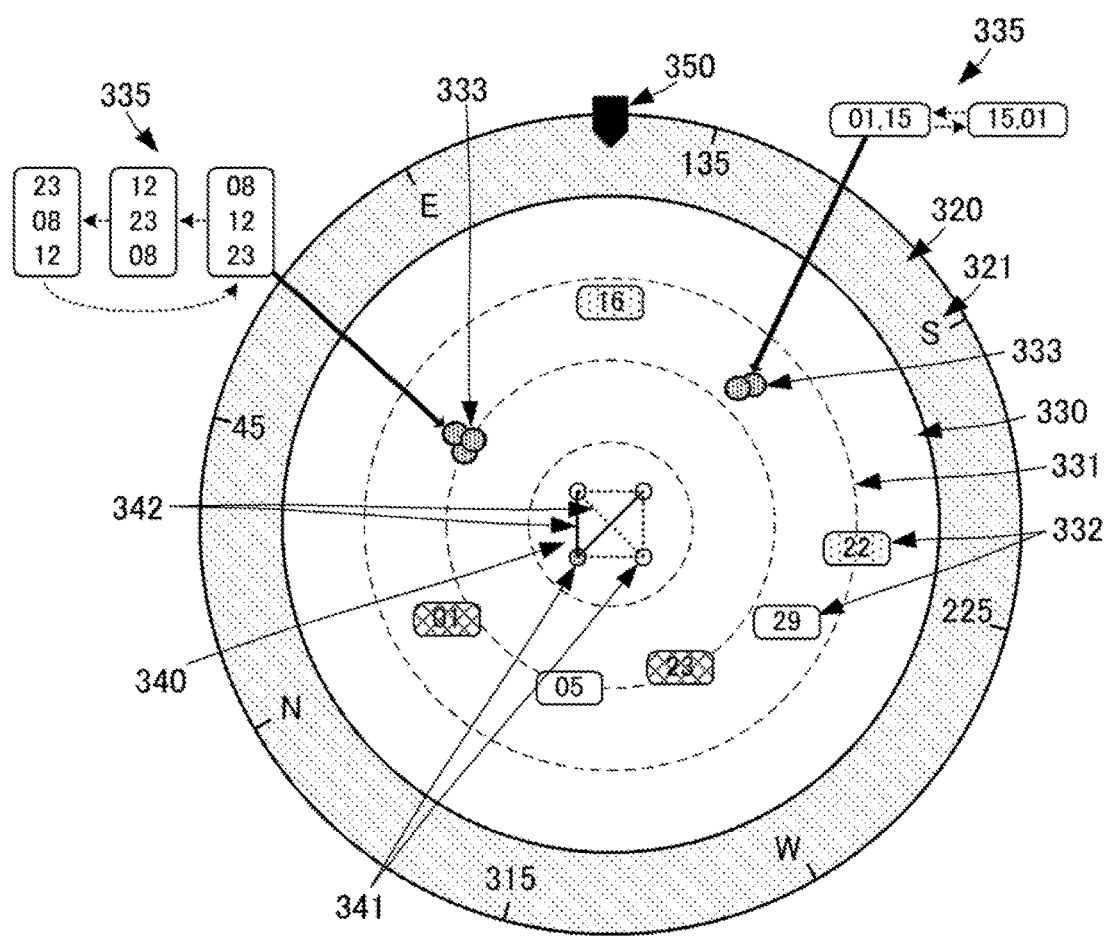
FIG. 17 is a view illustrating a display mode of the traveling state calculating device according to the third embodiment of the present disclosure.

Note that the position of the plurality of positioning satellites may overlap with each other on the display. In this case, the visibility of all the positioning satellites may be improved by using the following display mode. FIGS. 16 and 17 are views illustrating display modes of the traveling state calculating device according to the third embodiment of the present disclosure.

In the display mode illustrated in FIG. 16, if the positions are overlapped on the display according to the indication by the positioning satellite symbols, a temporary symbol 333 may be disposed in the satellite-location display part 330. The temporary symbol 333 may be smaller than the positioning satellite symbol 332. Thus, even if the positions of the positioning satellites are close to each other, the symbols may be less overlapped. An annotation symbol 334 may be attached to each temporary symbol 333. The annotation symbol 334 may be displayed in the same display mode as the positioning satellite symbol, and may be displayed outside the azimuth display part 320. The annotation symbols 334 may be displayed without being overlapped with each other. Since a sufficient area for the display exists outside the azimuth display part 320, the annotation symbol 334 may be displayed so that they are not easily overlapped.

The annotation symbol 334 and the temporary symbol 333 are connected via a leader arrow symbol. Thus, the visibility of all the positioning satellites may be improved.

In the display mode illustrated in FIG. 17, if the positions are overlapped on the display according to the indication of the positioning satellite symbols, the temporary symbols 333 may be disposed in the satellite-location display part 330. The temporary symbol 333 may be smaller than the positioning satellite symbol 332. A detailed display symbol 335 may be attached to a group of temporary symbols 333. The detailed display symbol 335 may be connected with the group of temporary symbols 333 via a leader arrow symbol. A group of satellite numbers of the positioning satellites which constitutes a group of temporary symbols may be displayed in the detailed display symbol 335. This satellite number group may be displayed so that an arrangement order of the satellite numbers changes sequentially. Thus, the visibility of all the positioning satellites may be improved.

Note that, although in the above description the example where the combination of the base line and the positioning satellite to be used for the attitude calculation may be set based on the accuracy degradation index, or the angle based on the line-of-sight vector, is illustrated, a combination of the base line and the positioning satellite which is further effective in the highly-precise calculation of the attitude angle may be selected by further performing the following verification. Note that, below, although one example of the selection of the combination of the base line and the positioning satellite may be illustrated, the adjustment of the weight coefficient may similarly be set. That is, the selection and the increasing the weight coefficient are similar processings, and the exclusion and the decreasing the weight coefficient are similar processings.

(A) Test of Base-Line Vector

A length of the base-line vector calculated using the positioning signals may be compared with a physical base line length which is known beforehand at the time of installation. If a difference between the calculated length of the base-line vector and the physical base line length is below a threshold, a single phase difference corresponding to the base-line vector may be used for the calculation of the attitude angle. If the difference between the calculated length of the base-line vector and the physical base line length is above the threshold, the single phase difference corresponding to the base-line vector may be excluded from the calculation of the attitude angle.

(B) Residual Threshold Test of Base-Line Vector

For a residual of the base-line vector calculated using the positioning signals, a $\chi^2$-test may be performed. If the $\chi^2$ value of the residual of the base-line vector is below the threshold, the single phase difference corresponding to the base-line vector may be used for the calculation of the attitude angle. If the $\chi^2$ value of the residual of the base-line vector is above the threshold, the single phase difference corresponding to the base-line vector may be excluded from the calculation of the attitude angle.

(C) Differentiation Value Test of Heading Direction (Yaw Angle $\psi$) of Base-Line Vector The calculated yaw angle $\psi$ may be acquired continuously and an amount of change with time of the yaw angle $\psi$ may be calculated. If an amount of change with time $\delta\psi$ of the yaw angle $\psi$ is below a threshold, the calculated yaw angle $\psi$ may be adopted. If the amount of change with time $\delta\psi$ of the yaw angle $\psi$ is above the threshold, the calculated yaw angle $\psi$ may not be adopted.

(D) Inner Product/Outer Product Test of Base-Line Vector

An inner product or an outer product of the two base-line vectors calculated using the positioning signals may be calculated. The inner product or outer product of the two base-line vectors may be calculated based on the physical spatial relationship of the antennas installed beforehand. If a difference between the inner product of the positioning signals and the inner product of the physical positions, or a difference between the outer product of the positioning signals and the outer product of the physical positions is below the threshold, the single phase difference corresponding to the base-line vector may be used for the calculation of the attitude angle. If the difference between the inner product of the positioning signals and the inner product of the physical positions, or the difference of the outer product of the positioning signals and the outer product of the physical positions is above the threshold, the single phase difference corresponding to the base-line vector may be excluded from the calculation of the attitude angle.

(E) Differentiation Value Test of Attitude Angle

Each component of the calculated attitude angle (the roll angle φ, the pitch angle θ, the yaw angle ψ) may be acquired continuously, and the amount of change with time is calculated, respectively. If the amount of change with time of each component of the attitude angle is below the threshold, the calculated attitude angle may be adopted. If the amount of change with time of each component of the attitude angle is above the threshold, the calculated attitude angle may not be adopted.

Note that in each embodiment described above the mode in which the single phase difference between the antennas may be used as the phase difference. However, a double phase difference between a vector connecting two antennas (base line) and a vector connecting two positioning satellites may be used. Here, a reference positioning satellite may be set.

When using the double phase difference, the contribution used for the calculation of the attitude angle (the weight, or the selected/unselected) may be determined based on an absolute value of the outer product of the vector connecting the two antennas and the vector connecting the two positioning satellites. More specifically, when using the weight coefficient, a larger weight is used for a larger absolute value of the outer product, whereas a smaller weight is used for a smaller absolute value of the outer product. Alternatively, when using the selected/unselected, a threshold for the absolute value of the outer product may be set, and if the absolute value of the outer product is above the threshold, the positioning satellite used for the calculation of the outer product may be selected, whereas if the absolute value of the outer product is below the threshold, the positioning satellite used for the calculation of the outer product may not be selected.

The invention claimed is:

1. An attitude angle calculating device, comprising:
  a plurality of antennas configured to receive positioning signals from a positioning satellite, respectively, the plurality of antennas connected by a plurality of base lines, each base line connecting two antennas among the plurality of antennas;
  a plurality of receivers provided for every antenna that constitutes the plurality of antennas, and configured to output data for calculation using the positioning signals received by the antennas; and
  processing circuitry configured
    to calculate each component of an attitude angle using the data for calculation;
    to determine a contribution of the data for calculation to the calculation of the attitude angle, corresponding to the component of the attitude angle, based on a spatial relationship between at least one of the plurality of the base lines and the positioning satellite; and
    to display projected positions of the positioning satellite onto a plane including the base lines, and the base lines, wherein
    the base lines used for positioning are displayed in a different display mode from the base lines not used for positioning.

2. The attitude angle calculating device of claim 1, wherein the processing circuitry is further configured:
  to calculate an accuracy degradation index corresponding to the component of the attitude angle based on the spatial relationship of the base line and the positioning satellite; and
  to determine the contribution using the accuracy degradation index.

3. The attitude angle calculating device of claim 2, wherein the processing circuitry is further configured to set the contribution to 0 when the accuracy degradation index is above a given threshold.

4. The attitude angle calculating device of claim 2, wherein processing circuitry is further configured to increase the contribution as the accuracy degradation index becomes smaller, while decreases the contribution as the accuracy degradation index becomes larger.

5. The attitude angle calculating device of claim 1, wherein the processing circuitry is further configured
  to calculate a phase difference corresponding to the base line, and
  to calculate the component of the attitude angle using the data for calculation and the phase difference.

6. The attitude angle calculating device of claim 5, wherein,
  the phase difference is a single phase difference between the antennas that constitute the base line, and
  the processing circuitry is further configured to increase the contribution of the data for calculation of the positioning satellite of which an angle between a straight line connecting a center of the base line and the positioning satellite, and the base line, is a substantially right angle.

7. The attitude angle calculating device of claim 5, wherein,
  the phase difference is a double phase difference between a vector of the base line connecting the two antennas and an inter-satellite vector connecting two positioning satellites that are senders of the positioning signals received by the two antennas, and
  the processing circuitry is further configured to increase the contribution of the data for calculation of the positioning satellite of which an angle between the vector of the base line and the inter-satellite vector is a substantially right angle.

8. The attitude angle calculating device of claim 1, wherein the processing circuitry is further configured to calculate the attitude angle by additionally using output data of an inertia sensor.

9. The attitude angle calculating device of claim 1, wherein the display further displays an absolute direction.

10. A method of calculating an attitude angle, comprising:
  receiving positioning signals from a positioning satellite;
  outputting data for calculation and using the positioning signals received by a plurality of antennas connected by a plurality of base lines, each base line connecting two antennas among the plurality of antennas;

determining a contribution of the data for calculation to a calculation of the attitude angle, corresponding to a component of the attitude angle, based on a spatial relationship between at least one of the plurality of the base lines and the positioning satellite;

calculating each component of the attitude angle using the data for calculation and the contribution; and displaying projected positions of the positioning satellite onto a plane including the base lines, and the base lines, wherein the base lines used for positioning are displayed in a different display mode from the base lines not used for positioning.

11. The method of claim 10, wherein the determining the contribution of the data for calculation includes:

calculating an accuracy degradation index corresponding to the component of the attitude angle based on the spatial relationship of the base line and the positioning satellite; and determining the contribution using the accuracy degradation index.

12. The method of claim 11, wherein the determining the contribution using the accuracy degradation index includes setting the contribution to 0 when the accuracy degradation index is above a given threshold.

13. The method of claim 11, wherein the determining the contribution using the accuracy degradation index includes increasing the contribution as the accuracy degradation index becomes smaller, while decreasing the contribution as the accuracy degradation index becomes larger.

14. The method of claim 10, further comprising calculating a phase difference corresponding to the base line, wherein the calculating each component of the attitude angle includes calculating the component of the attitude angle using the data for calculation and the phase difference.

15. The method of claim 14, wherein, the phase difference is a single phase difference between the antennas that constitute the base line, and the determining the contribution of the data for calculation includes increasing the contribution of the data for calculation of the positioning satellite of which an angle between a straight line connecting a center of the base line and the positioning satellite, and the base line, is a substantially right angle.

16. The method of claim 14, wherein, the phase difference is a double phase difference between a vector of the base line connecting the two antennas and an inter-satellite vector connecting two positioning satellites that are senders of the positioning signals received by the two antennas, and the determining the contribution of the data for calculation includes increasing the contribution of the data for calculation of the positioning satellite of which an angle between the vector of the base line and the inter-satellite vector is a substantially right angle.

17. The method of claim 10, wherein the calculating each component of the attitude angle includes calculating the attitude angle by additionally using output data of an inertia sensor.

18. An attitude angle calculating program configured to cause an information processing device to execute processing configured to calculate an attitude angle using positioning signals from a positioning satellite, the program causing the information processing device to execute:

outputting data for calculation using the positioning signals received by a plurality of antennas connected by a plurality of base lines, each base line connecting two antennas among the plurality of antennas;

determining a contribution of the data for calculation to a calculation of the attitude angle, corresponding to a component of the attitude angle, based on a spatial relationship between at least one of the plurality of the base lines and the positioning satellite;

calculating each component of the attitude angle using the data for calculation and the contribution; and displaying projected positions of the positioning satellite onto a plane including the base lines, and the base lines, wherein the base lines used for positioning are displayed in a different display mode from the base lines not used for positioning.

19. The attitude angle calculating program of claim 18, the determining the contribution of the data for calculation includes:

calculating an accuracy degradation index corresponding to the component of the attitude angle based on the spatial relationship of the base line and the positioning satellite; and determining the contribution using the accuracy degradation index.

* * * * *

UNITED STATES PATENT AND TRADEMARK OFFICE
CERTIFICATE OF CORRECTION

PATENT NO. : 10,514,469 B2
APPLICATION NO. : 15/540023
DATED : December 24, 2019
INVENTOR(S) : Naomi Fujisawa et al.

Page 1 of 1

It is certified that error appears in the above-identified patent and that said Letters Patent is hereby corrected as shown below:

In the Specification

Column 4, Line 31, delete "HA" and insert --11A--.

Signed and Sealed this
Twenty-fifth Day of February, 2020

Andrei Iancu
*Director of the United States Patent and Trademark Office*